May 16, 1933.  R. Z. HOPKINS ET AL  1,909,827
BRAKE TESTING MACHINE
Filed June 21, 1928   3 Sheets-Sheet 3
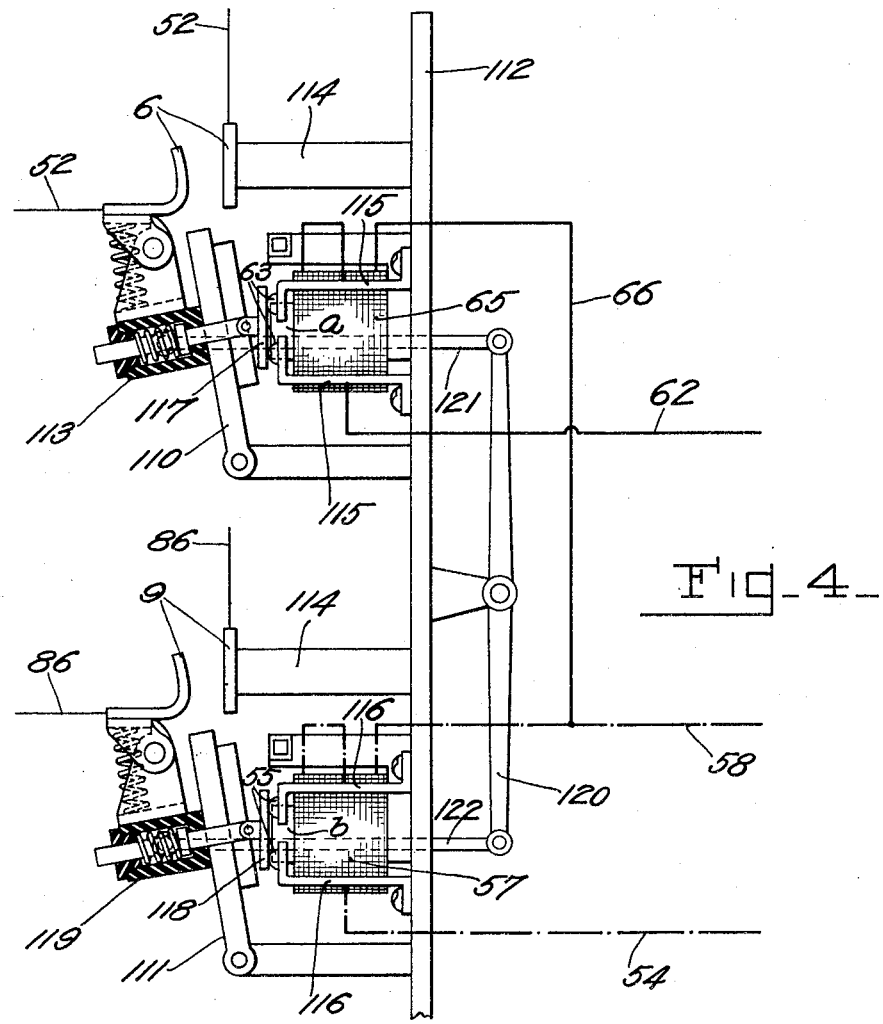
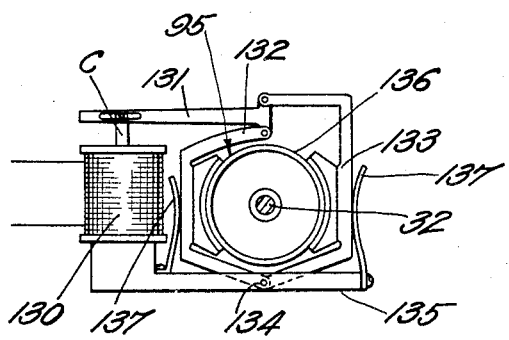
INVENTORS:
Ralph Z. Hopkins,
Albert E. Fellers, and
George S. Davey
by Macleod Calver Copeland & Dike Attys.

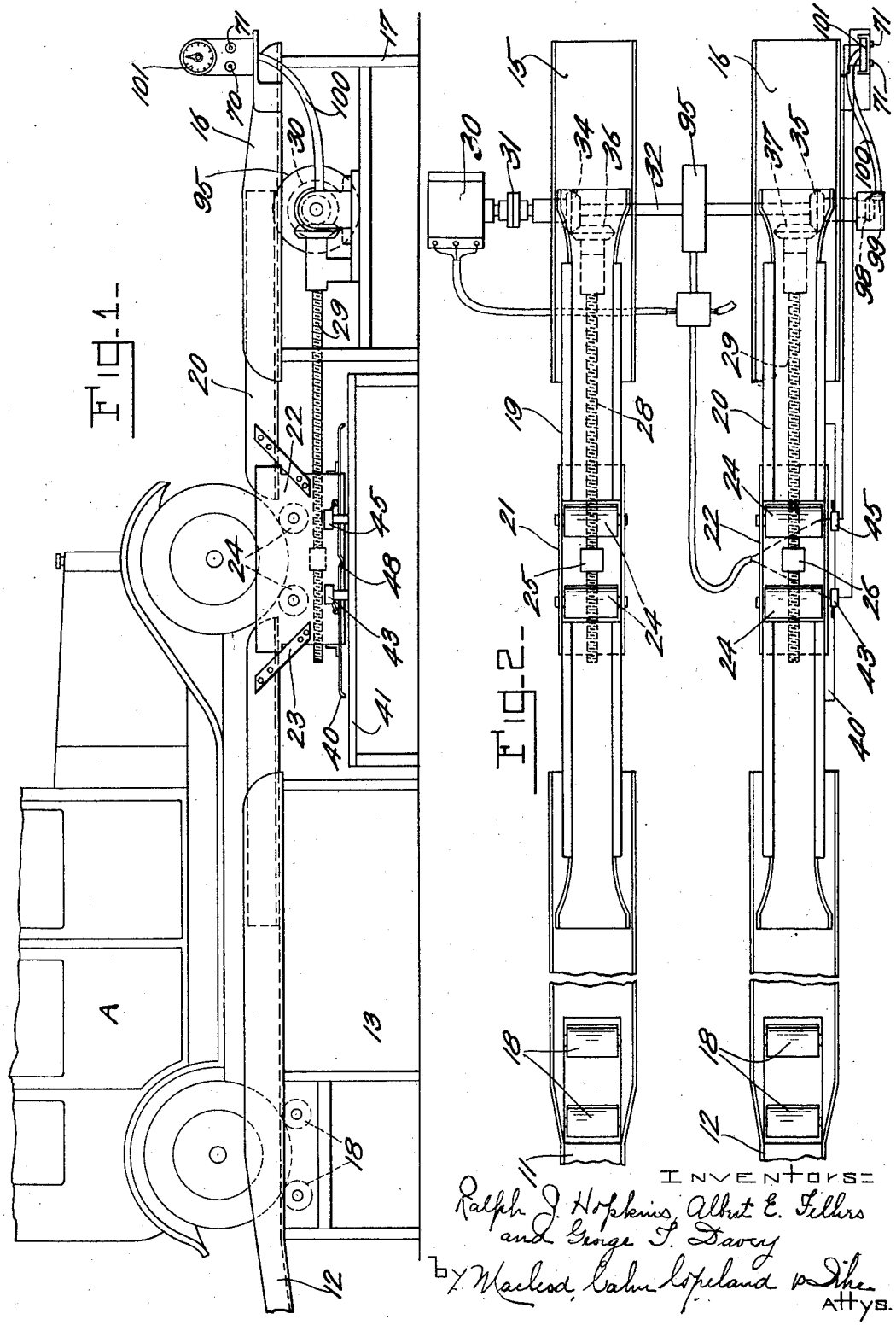

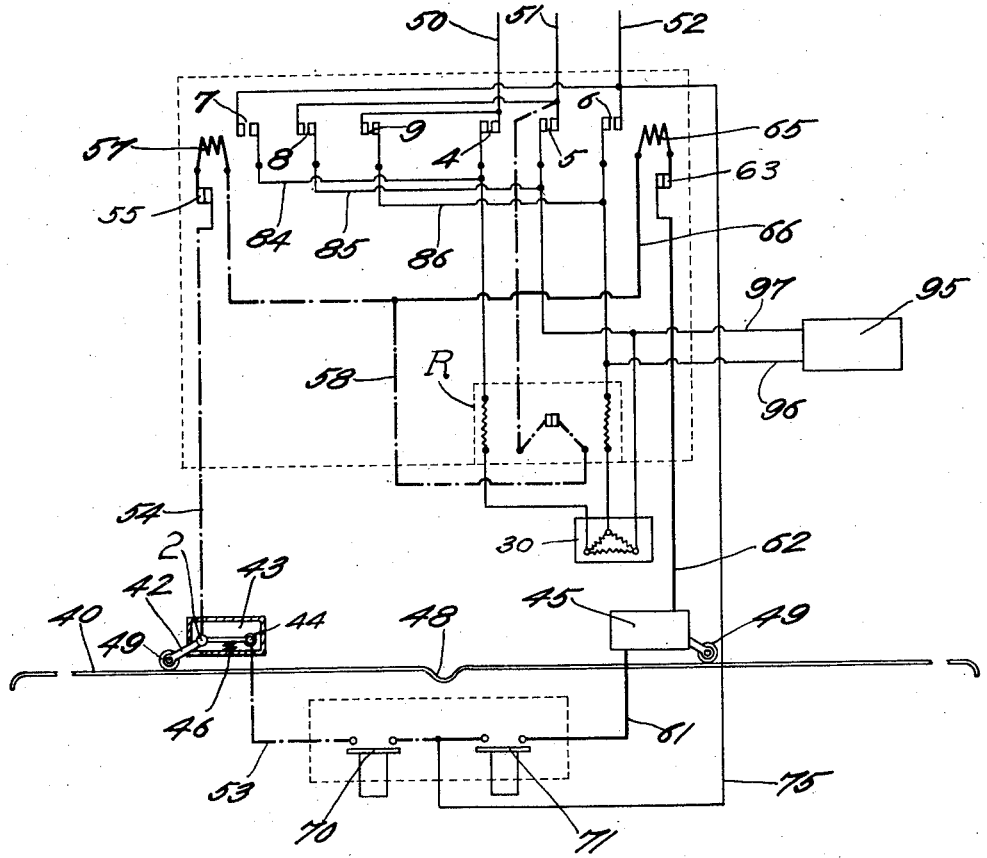
Fig_3_

Patented May 16, 1933

1,909,827

UNITED STATES PATENT OFFICE

RALPH Z. HOPKINS, ALBERT E. FELLERS, AND GEORGE T. DAVEY, OF DETROIT, MICHIGAN, ASSIGNORS TO HUDSON MOTOR CAR COMPANY, OF DETROIT, MICHIGAN, A CORPORATION OF MICHIGAN

BRAKE TESTING MACHINE

Application filed June 21, 1928. Serial No. 287,341.

This invention relates to devices for testing vehicle brakes and particularly to devices for testing the brakes of automobiles having a brake on each of the four wheels.

In official brake testing stations where the brakes of vehicles having different wheel bases are being tested it is necessary to adjust the testing machine repeatedly to accommodate these different wheel bases. The same is true in the plants of automobile manufacturers producing more than one type of automobile because successive vehicles reaching the test room may have a different wheel base. Heretofore, each adjustment has consumed considerable time and has limited unduly the number of vehicle brakes tested in a given time.

It is an object of the present invention to provide an arrangement for a brake testing device whereby the device may be readily, safely and conveniently adjusted to accommodate vehicles of different wheel bases.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

The invention will be more clearly understood from the following description in conjunction with the accompanying drawings in which:

Fig. 1 is a side elevation of a brake testing device embodying the invention;

Fig. 2 is a plan view of the same; and

Fig. 3 is a diagram showing the relation of the various parts of the device.

Fig. 4 is a side elevation partly in diagram and partly broken away of one type of reversing switch that may be used with the brake testing device embodying the invention.

Fig. 5 is a detail view of the magnetic brake.

A brake testing device embodying the invention may comprise a pair of elevated parallel runways the rear portions 11 and 12 of which are mounted upon a suitable stationary supporting structure 13 and the front portions 15 and 16 of which are likewise mounted upon a suitable stationary supporting structure 17. The intermediate portions 19 and 20 are supported upon movable carriages 21 and 22 respectively and are suitably secured thereto as by braces 23. Suitable rotors 18 and 24 are rotatably mounted in the rear supporting structure 13 and in carriages 21 and 22 for rotatably supporting the rear and front wheels respectively of a vehicle A. A suitable mechanism for driving the carriages 21 and 22 may comprise threaded blocks 25 and 26 mounted thereon to receive screw shafts 28 and 29 respectively. Shafts 28 and 29 are driven by a motor 30 the armature shaft of which is connected by a coupling 31 to a cross shaft 32 provided with bevelled gears 34 and 35 meshing with bevelled gears 36 and 37 mounted upon the shafts 28 and 29 respectively. A cam 40 is suitably mounted upon one of the carriages and is adapted to control limit switches 43 and 45 mounted upon a stationary table 41. Each of said switches is provided with an operating arm 42 pivoted intermediate its ends at 2 and at one end in engagement with the terminal 44 normally held by the cam but caused to move away from the terminal 44 by a spring 46 when reaching the central depression 48 therein. Preferably, the other end of each arm 42 is provided with a roll 49. The lead 54 is connected to arm 42 and lead 53 is connected to terminal 44.

The motor 30 which may be a three-phase reversing motor of usual construction is supplied with suitable electrical power from the three feed lines 50, 51 and 52. In accordance with the invention the operation of the motor is controlled to move the carriages 21 and 22 a predetermined desired amount in either direction. With this in view separate circuits are provided for controlling the operation of the motor in opposite directions. The limit switch 43 is included in a separate circuit indicated by heavy dot and dash lines in Fig. 3 and operatively connected with the motor through leads 53 and 54, contactor 55, coil 57 and lead 58. The limit switch 45 is likewise operatively connected with the motor by a separate circuit indicated by heavy full lines in Fig. 3 and comprising leads 61 and 62, contactor 63, coil 65, lead 66 and lead 58. The lead 58 forms a common portion in each of these separate circuits. Each of these circuits may be opened by the spring 46 when the arm 42 of the limit switches 43 or 45 reaches the central depression 48 of the cam 40. Switches 70 and 71 are provided in the leads 53 and 61 respectively for connecting either of these leads with the lead 75 from the feed line 52. At R is indicated an overload relay which is provided to protect the motor 30 from overloads.

The feed lines 50, 51 and 52 are provided with a set of make and break contactors 4, 5 and 6 which are shunted by circuits 84, 85 and 86 containing another set of make and break contactors 7, 8 and 9. The circuits 84 and 86 connect lines 50 and 52. The contactors 4, 5 and 6 are controlled by the coil 65 and the contactors 7, 8 and 9 are controlled by the coil 57.

The contactors 4, 5, 6 and 63 as well as the contactors 7, 8, 9 and 55 are of common construction. As illustrated in Fig. 4 the operating mechanism for the contactors comprises coils 65 and 57 having armatures 110 and 111 associated therewith respectively pivotally mounted on the frame 112. One member of each pair of contactors 6 and 9 is mounted on a block of insulation 113 and 119 on the armature 110 and 111 respectively. One member of each pair of the other contactors 4 and 5 are likewise carried by the armature 110 and one member of each pair of the contactors 7 and 8 are carried by the armature 111. The other member of each of the contactors 4, 5, 6, 7, 8 and 9 is carried on an insulated block 114 on the frame 112. The contactors 63 and 55 comprise terminals 115—115 and 116—116 forming part of the circuits to the limit switches 45 and 43 respectively and are adapted to be connected or disconnected by the switch members 117 and 118 respectively. These switch members are yieldingly mounted on the blocks 113 and 119 respectively and are adapted to be moved with the armatures 110 and 111. The armatures 110 and 111 are attracted to the cores $a$ and $b$ respectively of the coils 65 and 57 when the latter are energized and are mechanically interlocked by suitable mechanism comprising a lever 120 pivotally mounted on the frame 112. Rods 121 and 122 connect the ends of the lever with the blocks 113 and 119 respectively. It will be apparent that the interlock construction prevents closing of the contactors 4, 5, 6 at the same time as the contactors 7, 8, 9, and also that when one set of these contactors is closed to operate the motor in one direction, the circuit controlling the other set of contactors is broken by the contactors 63 or 55 as the case may be. As shown in Fig. 4, the contactors 63 and 55 are closed when the contactors 4, 5, 6 and 7, 8 and 9 are open, thus permitting either operating circuit to be closed depending on the direction in which it is desired to operate the motor, but preventing the closing of both circuits at the same time.

A magnetic brake 95 is provided upon the shaft 32 and acts mechanically when de-energized to hold the shaft 32 against movement but is released when power is transmitted through the leads 96 and 97 from the feed line.

A common type of magnetic brake suitable for this purpose comprises (Fig. 5) a solenoid 130 the core $c$ of which is pivotally connected to one end of an arm 131, the other end of which is pivotally connected to one end of each of the brake shoes 132 and 133, the other ends of which are pivotally mounted at 134 on the frame 135. A brake drum 136 is mounted on the shaft 32 adapted to cooperate with the shoes 132 and 133. Springs 137 are provided which normally act upon the shoes 132 and 133 to press the same into engagement with the drum. When the solenoid 130 is energized the arm 131 is actuated to move the shoes out of engagement with the drum in opposition to the springs 137.

The shaft 32 may be provided with a bevelled gear 98 adapted to mesh with a bevelled gear 99 upon one end of a flexible shaft 100, the other end of which is operatively connected with a dial 101 for indicating the distance of travel of the carriages 21 and 22. The dial 101 and the switches 70 and 71 may, if desired, be mounted together upon a single panel conveniently accessible to the operator.

When the switch 70 is closed manually the circuit containing limit switch 43 is energized and the contactors 7, 8 and 9 are closed due to the influence of the coil 57 thereby rotating the motor 30 and shifting the carriages 21 and 22 in one direction. By closing the switch 71 the circuit containing limit switch 45 is energized and the contactors 4, 5 and 6 are closed due to the influence of the coil 65 thereby shifting the carriages in the opposite direction. When the carriages have moved to the desired position as indicated upon the dial 101, the operator opens the switch 70 or 71 which has been closed to control the movement. This deenergizes the solenoid 130 and permits the springs 137 to apply the brake and prevent further movement of the shaft 32. If the operator should fail to open the switch 70 or 71 when one of the circuits has been energized to move the carriages, the circuit will be deenergized to stop the carriages automatically at a predetermined point by the movement of the arm 42 by the spring 46 into the central depression 48 of the cam 40.

What we claim is:

1. In an apparatus for testing the brakes of a vehicle, the combination of separate supports for the front and rear wheels of the vehicle, mechanism including an electric motor for shifting one of said supports in opposite directions, different electrical circuits to said motor for controlling the movement of said support in opposite directions each having a switch for completing said circuits to move said support in a given direction and opening said completed circuit to stop said support at a desired position and means for automatically stopping said mechanism by opening said complete circuit at a given point in the movement of said support in either direction.

2. In an apparatus for testing the brakes of a vehicle, the combination of separate supports for the front and rear wheels of the vehicle, mechanism including an electric motor for shifting one of said supports in opposite directions, different electrical circuits to said motor for controlling the movement of said support in opposite directions each having a switch for completing said circuits to move said support in a given direction and opening said completed circuit to stop said support at a desired position, a limit switch in each of said circuits, and a cam for controlling said limit switches and adapted to cause the same to open automatically to stop said support and limit its movement in either direction.

3. In an apparatus for testing the brakes of a vehicle, the combination of separate supports for the front and rear wheels of the vehicle, mechanism including an electric motor for shifting one of said supports in opposite directions, different electrical circuits to said motor for controlling the movement of said support in opposite directions each having a switch for completing said circuits to move said support in a given direction and opening said completed circuit to stop said support at a desired position and means for automatically stopping said mechanism by opening said completed circuit at a given point in the movement of said support in either direction, a brake, and means for rendering said brake inoperative when either of said circuits is closed.

In testimony whereof we affix our signatures.

RALPH Z. HOPKINS.
ALBERT E. FELLERS.
GEORGE T. DAVEY.